F. W. SCHROEDER.
CLAMPING DEVICE FOR BELTS.
APPLICATION FILED MAY 1, 1912.

1,086,090.

Patented Feb. 3, 1914.

WITNESSES:
Fredk H. W. Fraentzel
Harry E. Pfeiffer

INVENTOR:
Frederick W. Schroeder,
BY
Fraentzel and Richards,
ATTORNEYS

UNITED STATES PATENT OFFICE.

FREDERICK W. SCHROEDER, OF NEWARK, NEW JERSEY.

CLAMPING DEVICE FOR BELTS.

1,086,090. Specification of Letters Patent. Patented Feb. 3, 1914.

Application filed May 1, 1912. Serial No. 694,320.

*To all whom it may concern:*

Be it known that I, FREDERICK W. SCHROEDER, a citizen of the United States, residing at Newark, in the county of Essex and State of New Jersey, have invented certain new and useful Improvements in Clamping Devices for Belts; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in clasps or holding devices; and the present invention relates, more particularly, to a novel clamp or holding device which is especially adapted for use in connection with the respective end-portions of belts, such as are worn with garments, but which may also be put to various other uses.

The present invention has for its principal object to provide a novel and simply constructed clasp or fastener for belts and other uses, with a view of producing a clasp or fastener in which the parts have been reduced to a minimum, and in which the parts are of a strong construction, being provided with a spring-actuated clamping member or element, which, when the clasp is in its operative relation with the end-portion of a belt, firmly and positively clamps or grasps the said end-portion of the belt, so that no matter how great the pull or strain, the clasp or fastener will not become displaced, but can be readily removed or adjusted by the manipulation of the clamping member or element by the operator.

With the various objects of the present invention in view, the said invention consists, primarily, of the novel form of belt-clasp or fastener hereinafter more particularly set forth, and finally embodied in the clauses of the claim which are appended to this specification, and form an essential part of the same.

The invention is illustrated in the accompanying drawings, in which:—

Figure 1:
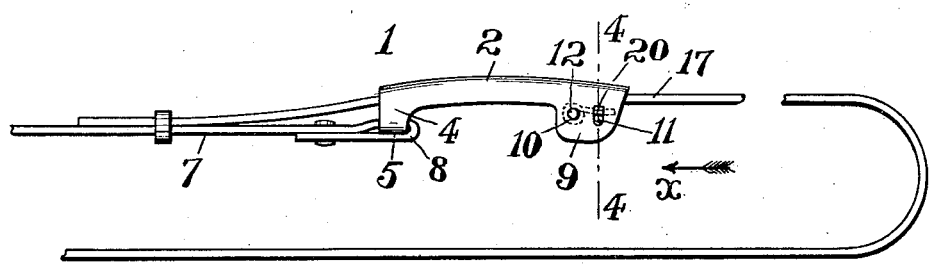
Figure 2:
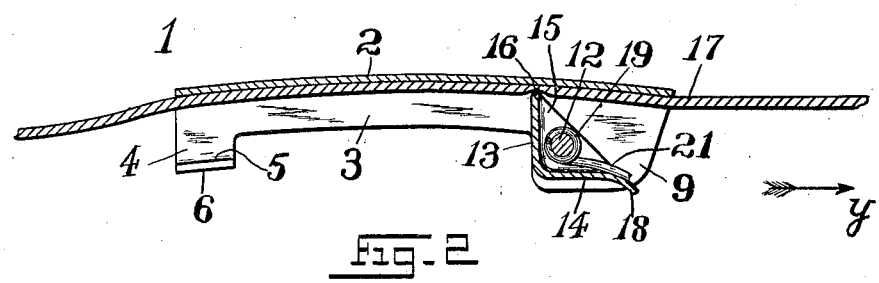
Figure 3:
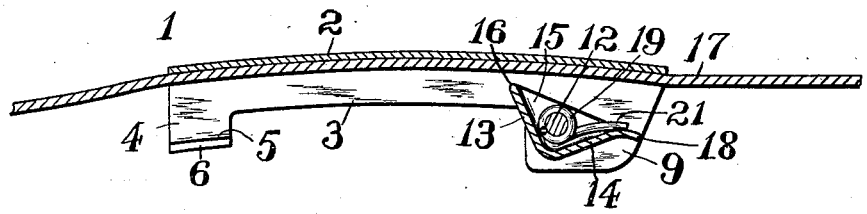
Figure 4:
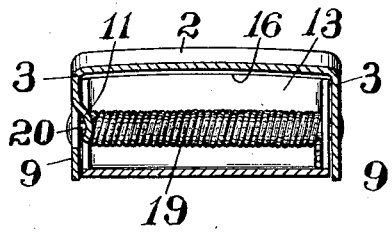

Figure 1 is a side elevation of a belt-clasp made according to and embodying the principles of the present invention, showing in connection therewith, the two end-portions of a belt clasp or fastener is employed. Fig. 2 is a longitudinal vertical sectional representation of the belt-clasp and the one end-portion of the belt, said view being made on an enlarged scale and said view representing the clasp or fastener in its clasped or holding relation with the said end-portion of the belt; Fig. 3 is a similar sectional representation of the same parts, but showing the clamping element of the clasp or fastener in its released relation from the end-portion of the belt; and Fig. 4 is a transverse sectional representation, taken on line 4—4 in Fig. 1, looking in the direction of the arrow $x$, said view being also made on an enlarged scale.

Similar characters of reference are employed in all of the above described views, to indicate corresponding parts.

Referring now to the several figures of the drawings, the reference-numeral 1 indicates the complete belt-clasp or fastener made according to and embodying the principles of the present invention, and the same comprises a suitably formed and ornamental face-plate 2 which is preferably outwardly convexed, substantially as shown in the several figures of the drawings, the said face-plate being provided at its opposite and longitudinally extending marginal edge-portions with downwardly extending rib-like flanges 3. At or near the one end of each flange is a downwardly extending projection, as 4, each projection 4 being suitably bent, as at 5, and being formed with an inwardly extending finger or holding member 6, the two inwardly extending fingers or holding-members 6 providing a suitable securing bar to which may be suitably secured the loop-shaped end-portion 8 of the end 7 of the belt. At the other end of each flange 3 is a downwardly extending pivot-ear 9, each ear being provided with a perforation 10, and one of said ears being formed with an inwardly extending holding tongue or lug 11 which is suitably pressed out of the metal ear, as will be clearly seen from an inspection of Fig. 4 of the drawings. Suitably arranged between the said pivot-ears 9, with its end-portions mounted in the perforations 10, is a supporting pin or rod 12, and pivotally mounted upon the said pin or rod 12 is the belt-clamping member hereinabove mentioned. This belt-clamping member consists, essentially, of a pair of body-portions 13 and 14, which are angularly connected with each other, preferably at a right angle as shown, and are connected at both ends by perforated ear-like pivot-members 15 by means of which the said belt-clamping member is also pivotally or oscillatorily mounted upon the pin or rod 12. The body-portion 13 provides a suitable clamping member, the marginal edge-portion 16 of which is the grasping edge of the same which is adapted to be brought into clamped or grasped relation with the end-portion 17 of the belt. The other body-portion 14 is formed with a suitably curved and downwardly bent edge-portion 18 which provides a suitable finger-piece for the purposes to be presently set forth. Encircling that portion of the pin or rod 12 between the said ear-like pivot-members 15 is a helical or coiled spring 19, said spring having its one free end-portion 20 extending beyond the edge of the ear-like pivot-member 15 and arranged in holding engagement between the inner surface of the one downwardly extending pivot-ear 9 and the inwardly extending holding tongue or lug connected therewith. The other free end-portion 21 of the said spring, as will be seen from Figs. 2, 3 and 4 of the drawings, bears in a downward direction upon the upper surface of the previously mentioned body-portion 14 with the result that the grasping edge 16 of the body-portion 13 is firmly forced against the under surface of the end-portion 17 of the belt, as clearly shown in said Fig. 2 of the drawings. It will be fully evident from an inspection of said Fig. 2 that no matter how strong or great a pull is exerted in the direction of the arrow $y$ upon the end-portion 17 of the belt, the said grasping edge 16 of the body-portion 13 will not become displaced and the greater the pull the more positively will the end-portion 17 of the belt be connected or secured to the face-plate 2 of the clasp or fastener 1.

In order to release the clasp or fastener 1 from its holding relation with the end-portion 17 of the belt, all that is necessary, is to apply a light pressure in an upward direction upon the finger-piece 18 of the body-portion 14, whereby the grasping edge 16 of the body-portion 13 is readily released, as will be clearly evident; or, if the belt is to be tightened or adjusted, while in position upon the body of the wearer, a pull upon the free end-portion of the belt in the direction of the arrow $x$, see Fig. 1, will permit the belt-portion to readily slip over the grasping edge 16, but will immediately be held in its positively clamped relation to said edge as soon as the pull in the direction of the arrow $x$ is removed.

From the foregoing description of the present invention, it will be clearly seen that I have devised a simply constructed belt-clasp or fastener which can be cheaply made, and the grasping and pulling action of which is most positive, no matter how great the strain or pull, so that the belt will be properly retained in its secured relation about the body of the wearer.

I claim:—

1. A belt-clasp or fastener comprising a face-plate having downwardly and longitudinally extending marginal rib-like members, said members being provided at one end with means for permanently securing the one end-portion of a belt thereto, and a clamping member consisting of a pair of angularly disposed body-portions, and a pair of perforated ear-like pivot-members connecting said body-portions, a supporting pin extending through said ear-like pivot-members, said pin having its end-portions connected with the said marginal rib-like members, one of said body-portions being formed with a finger-piece, an inwardly projecting tongue connected with one of said rib-like members, and a coiled spring arranged between said angularly disposed body-portions and the pivot-members of said clamping member, said spring encircling said supporting pin between the said ear-like pivot-members, said spring having its one free end-portion in holding engagement with said tongue, and said spring having its other free end-portion in bearing engagement with said fingerpiece-provided body-portion for normally forcing the said grasping edge in a direction toward the under surface of the face-plate of the belt-clasp or fastener.

2. A belt clasp or fastener comprising a face-plate having downwardly and longitudinally extending rib-like members, downwardly extending projections at one end of said rib-like members, and inwardly extending fingers connected with said projections providing means for permanently securing the one end-portion of a belt thereto, downwardly extending pivot-ears connected with the other ends of said rib-like members, and a clamping member pivotally mounted between said pivot-ears, said clamping member consisting of a pair of angularly disposed body-portions, and a pair of perforated ear-like pivot-members connecting said body-portions, a supporting pin extending through said ear-like pivot-members, said pin having its end-portions mounted in said pivot-ears, one of said body-portions having a grasping edge, and the other body-portion being formed with a fingerpiece, an inwardly projecting tongue connected with one of said pivot-ears, and a coiled spring arranged between said angularly disposed body-portions and the pivot-members of said clamping member, said spring encircling said supporting pin between the said ear-like pivot-members, said spring having its one free end-portion in holding engagement with said tongue, and said spring ha ing its other free end-portion in bearing-engagement with said fingerpiece-provided body-portion for normally forcing the said grasping edge in a direction toward the under surface of the face-plate of the belt-clasp or fastener.

In testimony, that I claim the invention set forth above I have hereunto set my hand this 27th day of April, 1912.

FREDERICK W. SCHROEDER.

Witnesses:
FREDK. C. FRAENTZEL,
FREDK. H. W. FRAENTZEL.

Copies of this patent may be obtained for five cents each, by addressing the "Commissioner of Patents, Washington, D. C."